United States Patent [19]

Ishikawa et al.

[11] Patent Number: 4,811,827

[45] Date of Patent: Mar. 14, 1989

[54] LOCK-UP CLUTCH CONTROL METHOD IN AUTOMATIC TRANSMISSIONS FOR AUTOMOTIVE VEHICLES

[75] Inventors: Kazuo Ishikawa; Yoshinori Nishi, both of Aichi, Japan

[73] Assignee: Aisin Seiki Kabushiki Kaisha, Kariya, Japan

[21] Appl. No.: 73,092

[22] Filed: Jul. 14, 1987

[30] Foreign Application Priority Data

Jul. 15, 1986 [JP] Japan .................................. 61-164767

[51] Int. Cl.$^4$ ............................................ B60K 41/02
[52] U.S. Cl. .................... 192/0.076; 192/0.092
[58] Field of Search ............... 192/0.092, 0.052, 0.076, 192/3.31, 3.52

[56] References Cited

U.S. PATENT DOCUMENTS

| | | | |
|---|---|---|---|
| 4,516,671 | 5/1985 | Nishikawa et al. | 192/0.076 |
| 4,548,307 | 10/1985 | Nishikawa et al. | 192/0.076 |
| 4,570,770 | 2/1986 | Nishikawa et al. | 192/0.052 |
| 4,597,482 | 7/1986 | Sakurai et al. | 192/0.052 |
| 4,618,037 | 10/1986 | Nishikawa et al. | 192/0.092 X |
| 4,640,394 | 2/1987 | Higashi et al. | 192/0.092 X |
| 4,658,943 | 4/1987 | Nishikawa et al. | 192/0.052 X |

Primary Examiner—David A. Scherbel
Assistant Examiner—Creighton Smith
Attorney, Agent, or Firm—Burns, Doane, Swecker & Mathis

[57] ABSTRACT

A lock-up clutch of an automatic transmission is controlled by an electronic control unit using a gear shift diagram and a lock-up clutch changeover diagram each having vehicle velocity plotted along identical abscissa and throttle opening plotted along identical ordinate. Changeover of the lock-up clutch is controlled upon setting a changeover line in the changeover diagram in accordance with which the lock-up clutch is changed over from OFF to ON state, and changeover of transmission gear ranges is controlled upon setting a transmission gear range changeover point in the gear shift diagram. The changeover line is set in such a manner that it will not intersect a region in the gear shift diagram where the shift position is 2nd gear range or less and the throttle opening is less than a predetermined value. Thus, the lock-up clutch is not engaged in a case where the transmission is in 2nd gear range or less and, moreover, the throttle opening is less than a predetermined value.

6 Claims, 6 Drawing Sheets

LOCK-UP CLUTCH CONTROL METHOD IN AUTOMATIC TRANSMISSIONS FOR AUTOMOTIVE VEHICLES

BACKGROUND OF THE INVENTION

This invention relates to a method of controlling an automatic transmission equipped with a lock-up clutch and having a torque converter. More particularly, the invention relates to a method of controlling changeover of the lock-up clutch when speed ranges (gear ranges) in the transmission are shifted.

A conventional method of controlling a lock-up clutch (direct-coupling clutch or high-gear clutch) in an automatic transmission of the above-described type is disclosed in the specification of Japanese Patent Publication (KOKOKU) No. 60-32063 and will now be described in connection with FIGS. 8 and 9, which are diagrams illustrating examples of gear shift lines and lock-up clutch changeover lines in the D range.

In FIG. 8, the solid lines 1st→2nd, 2nd→3rd are up-shift lines from 1st gear range to 2nd gear range and from 2nd gear range to 3rd gear range, respectively. The dashed lines 1st→2nd, 2nd→3rd are down-shift lines from 2nd gear range to 1st gear range and from 3rd gear range to 2nd gear range, respectively. In FIG. 9, the solid line OFF→ON and dashed line OFF→ON in 2nd gear range represent a changeover line in which the lock-up clutch is switched from disengaged to engaged state in 2nd gear range, and a changeover line in which the lock-up clutch is switched from engaged to disengaged state in 2nd gear range, respectively. The solid lines OFF→ON and dashed line OFF→ON in 3rd represent a changeover line in which the lock-up clutch is switched from disengaged to engaged state in 3rd gear range, and a changeover line in which the lock-up clutch is switched from engaged to disengaged state in 3rd gear range, respectively.

In the conventional control method, as is evident from FIGS. 8 and 9, the arrangement is such that the lock-up clutch operates in each gear range from 2nd gear range onward in the throttle opening range of 0 to 100% in order to improve fuel consumption. When the vehicle is propelled forward to start from rest in the ordinary manner, the shifting process is such that an up-shift is made from 1st to 2nd, the lock-up clutch is engaged and disengaged in 2nd, an up-shift is then made from 2nd to 3rd, and the lock-up clutch is engaged in 3rd. If the automatic transmission has four forward speed ranges inclusive of overdrive, the shifting process further includes releasing the lock-up clutch, up-shifting from 3rd to O/D and then engaging the lock-up clutch. Thus, the engagement and release of the lock-up clutch is repeated a number of times in a short period.

Engaging and disengaging the lock-up clutch in this manner is accompanied by gear-shift shock that results in driver discomfort, which becomes more pronounced at lower throttle openings. The reason for this is that since vehicle acceleration is low at lower throttle openings, the change in acceleration attendant upon the engagement or disengagement of the lock-up clutch becomes relatively large with respect to vehicle acceleration and is easily sensed by the driver.

SUMMARY OF THE DISCLOSURE

Accordingly, it is a primary object of the present invention to solve the aforementioned problem encountered in the conventional lock-up clutch control method and its object is to provide a lock-up clutch control method in which engagement of the lock-up clutch is inhibited when shifting gear ranges, at least in a shift involving 2nd gear range, under a condition where the throttle valve opening is less than a predetermined value, thereby providing comfortable travel by mitigating the discomfort that accompanies the shock produced when gear ranges are shifted.

Further objects will become apparent in the entire disclosure.

According to the present invention, the foregoing object is attained by providing a method of controlling a lock-up clutch in an automatic transmission of an automotive vehicle comprising the lock-up clutch, a fluidic torque converter and a gear change mechanism, and an electronic control unit therefor, the method comprising the steps of:

controlling, by the electronic control unit, the changeover of the lock-up clutch by setting a changeover line turning the lock-up clutch from OFF to ON in a changeover diagram in which vehicle velocity and throttle opening are plotted along respective coordinate axes; and controlling, by the electronic control unit, the changeover of transmission gear ranges by setting a transmission gear range changeover point in a gear shift diagram having coordinate axes identical with those of said changeover diagram; and the method further comprising:

setting the changeover line in such a manner that it will not intersect a region in the gear shift diagram where the shift position is at least 2nd gear range or less and the throttle opening is less than a predetermined value.

Thus, the invention is characterized in that the changeover of the lock-up valve is controlled upon setting the changeover line in the lock-up clutch changeover diagram in such a manner that the changeover line will not intersect a region in the gear shift diagram where the shift position is at least 2nd gear range and the throttle opening is less than a predetermined value. Accordingly, if the gear position is 2nd gear range or less and, moreover, the throttle opening is less than a predetermined value, the lock-up clutch will not engage and, hence, the driver will not receive a shock produced by a gear shift.

Thus, in accordance with the invention, the lock-up clutch is not engaged in a case where the transmission is in 2nd gear range or less and, moreover, the throttle opening is less than a predetermined value. This makes it possible to greatly reduce gear-shift shock at lower throttle openings, which is the region wherein the driver is most susceptible to such shock.

Though the lock-up clutch per se is provided in order to reduce fuel consumption, this action of the lock-up clutch is virtually unaffected despite the fact that lock-up is inhibited in the aforementioned region. The reason is that the vehicle ordinarily travels in the lower gear ranges and in the region of the low throttle opening only for a comparatively short period of time.

Another advantage of the invention is that the lifetime of the lock-up clutch mechanism can be extended by reducing the number of times the lock-up clutch is turned engaged and disengaged in the region of low throttle opening.

DETAILED DESCRIPTION

Figure 1:
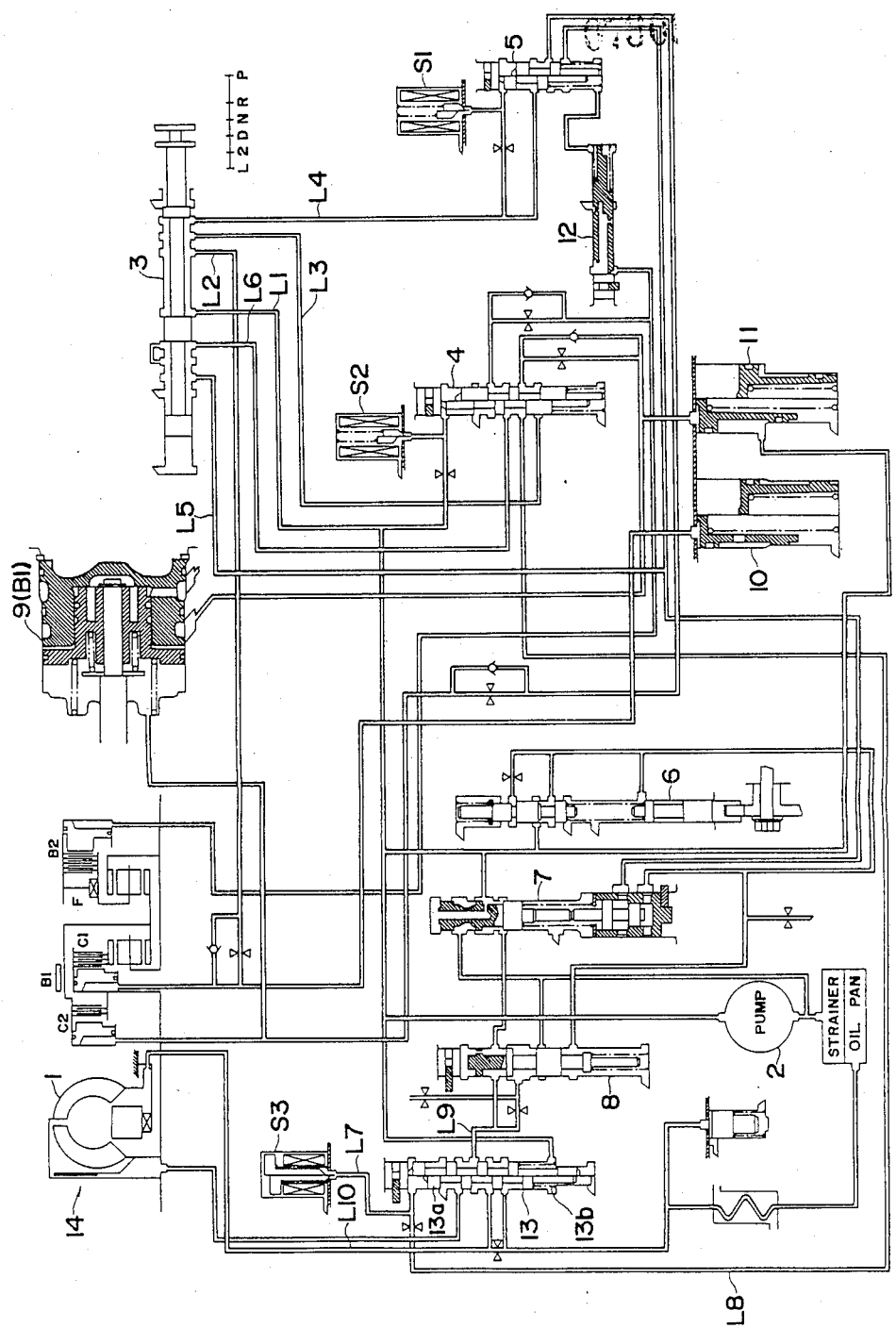
FIG. 1 is a circuit diagram illustrating a hydraulic circuit of an automatic transmission controlled in accordance with the method of the invention.

The present invention will now be described on the basis of a preferred embodiment illustrated in the drawings.

FIG. 1 illustrates a hydraulic control system for an automatic transmission controlled in accordance with the method of the invention.

With reference to FIG. 1, the hydraulic control system in associated with a torque converter 1 and includes a hydraulic pump 2, a manual valve 3, a 1–2 shift valve 4, a 2–3 shift valve 5, a throttle valve 6, a primary regulator valve 7, a secondary regulator valve 8, a B1 servo-valve 9, a C1 accumulator 10, a B1 accumulator 11, a B2 converter valve 12, and solenoid valves S1, S2.

In the hydraulic control system of FIG. 1, an oil line L1 from the hydraulic pump 2 is connected to oil lines L2, L3, L4, L5 and L6 by the manual valve 3, and the solenoid valves S1, S2, clutches C1, C2, F and brakes B1, B2 are operated, as shown in the following Tables in accordance with shift lever positions P, R, N, D and 2:

TABLE 1

|   | Line L1 | Line L3 | Line L4 | Line L5 | Line L6 |
|---|---|---|---|---|---|
| P | X | X | X | X | O |
| R | X | X | X | O | O |
| N | X | X | X | X | X |
| D | O | O | O | X | X |
| 2 | O | O | X | X | X |
| L | O | X | X | X | O |

TABLE 2

|   |   | S1 | S2 | C1 | C2 | B1 | B2 | F |
|---|---|---|---|---|---|---|---|---|
| P |   | X | X |   |   |   |   |   |
| R |   | X | X |   | O |   | O |   |
| N |   | X | X |   |   |   |   |   |
| D | 3rd | X | X | O | O | O |   |   |
|   | 2nd | X | O | O |   | O |   |   |
|   | 1st | O | O | O |   |   |   | O |
| 2 | 2nd | X | X | O |   | O |   |   |
|   | 1st | O | X | O |   |   |   | O |
| L | 1st | X | X | O |   |   | O |   |

In FIG. 1, a lock-up control valve 13 having a spool 13a and a spring 13b is for engaging and disengaging a lock-up clutch (direct-coupling clutch) 14 in response to operation of the solenoid valve S3. More specifically, when the solenoid valve S3 is energized, the oil line L7 closes and the spool 13a is urged downwardly by hydraulic pressure from the line L8, whereby lines L9 and L10 are brought into communication to supply pressurized oil that engages the lock-up clutch 14. When the solenoid valve 13 is in the deenergized state, on the other hand, pressurized oil from line L8 drains from the line L7, so that the spool 13a is held at its upper position in FIG. 1 by the spring 13b. As a result, the lines L9 and L10 are cut off from each other so that the lock-up clutch 14 is disengaged.

Figure 2:
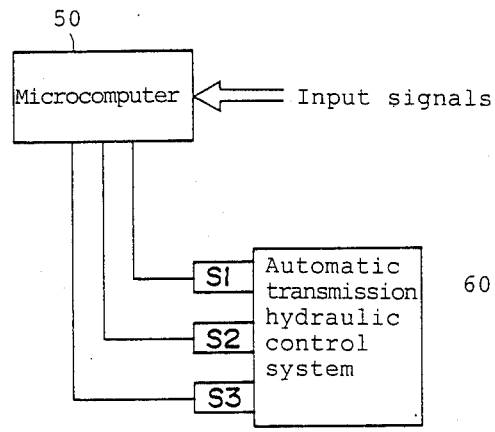
FIG. 2 is a block diagram illustrating a system for controlling the automatic transmission.

Thus, the gear ranges in the transmission are shifted by control based on operation of the two solenoid valves S1, S2, and the lock-up clutch is engaged and disengaged by control based on operation of the solenoid valve S3. The three solenoid valves S1, S2, S3 are operated by a microcomputer 50, as shown in FIG. 2. The microcomputer 50 has its output side connected to the solenoid valves S1, S2, S3 of the hydraulic control system, indicated at numeral 60, and controls these solenoid valve upon executing processing based on input signals from various sensors and the like.

The control executed by the microcomputer 50 for engaging and disengaging the lock-up clutch 14 will now be described with reference to the flow charts of FIGS. 3 and 4. The gear shift line for the D range is shown in the diagram of FIG. 5, and the lock-up clutch changeover line is shown in the diagram of FIG. 6 in accordance with the present embodiment.

Figure 3:
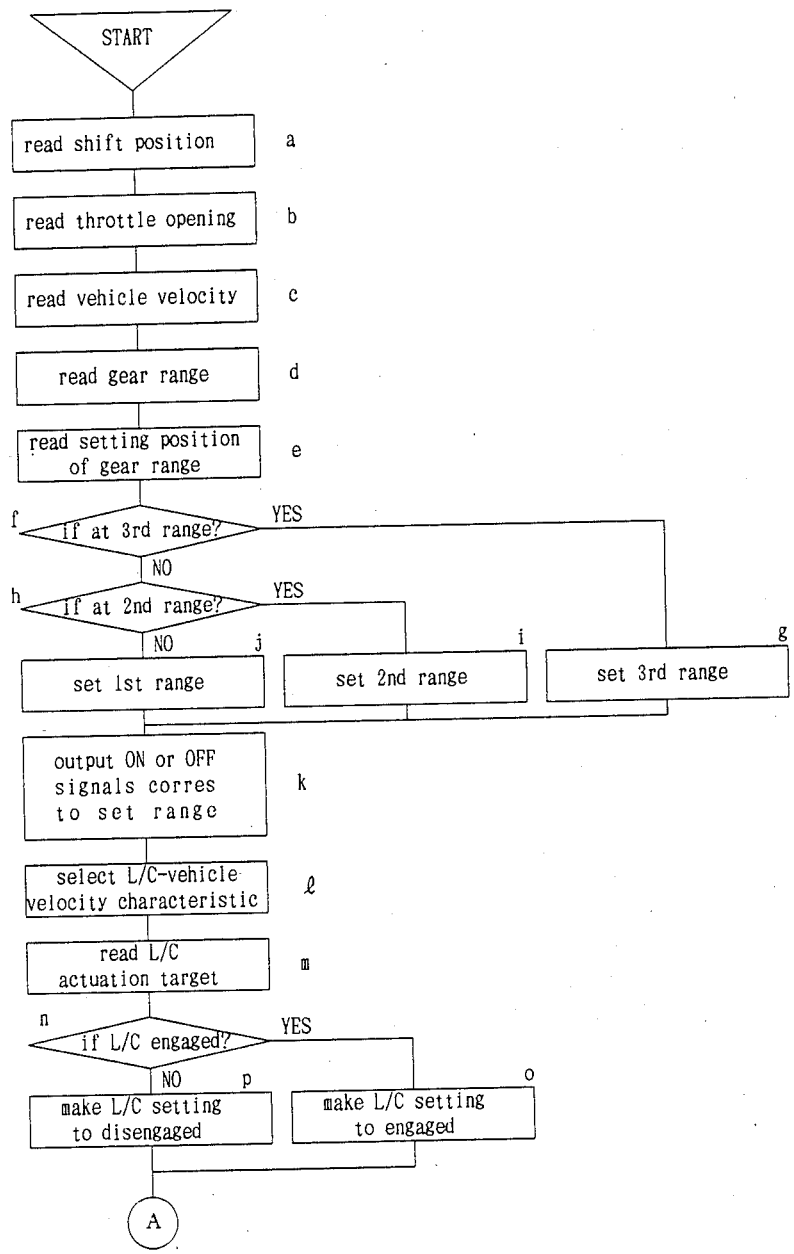
FIGS. 3 and 4 are flow charts illustrating an embodiment of the control method according to the invention.

In FIG. 3, a step (a) calls for the shift position to be read after the engine is started. This is followed by reading the throttle opening at a step (b), reading the vehicle velocity at a step (c), reading the shift position at a step (d) and, if the shift position is the D range, proceeding with the execution of the program. Next, at a step (e), the set position of the gear range (namely coordinates in the diagram of FIG. 5) is read based on the vehicle velocity and throttle opening. A step (f) then calls for a determination as to whether the read gear position lies in the 3rd gear range. If the answer is YES, then 3rd gear range is set at a step (g); if the answer is NO, then it is determined at a step (h) whether the read gear position lies in the 2nd gear range. If the answer at step (h) is YES, then 2nd gear range is set at a step (i); if the answer is NO, then 1st gear range is set at a step (j). In accordance with these gear settings, the microcomputer 50 outputs on/off signals to the solenoid valves S1, S2 for gear shifting. This is performed at step (k).

Next, the vehicle velocity characteristic of the lock-up clutch is selected at a step (l). This entails setting the lock-up clutch changeover diagram shown in FIG. 6. As will be appreciated from the FIGS. 5 and 6, the lock-up clutch changeover diagram of FIG. 6 is set in such a manner that the off-to-on changeover line of the clutch does not intersect the 2nd gear range of FIG. 5 (hatched area in FIG. 6) at a region where the throttle opening is less than 50%.

Figure 6:
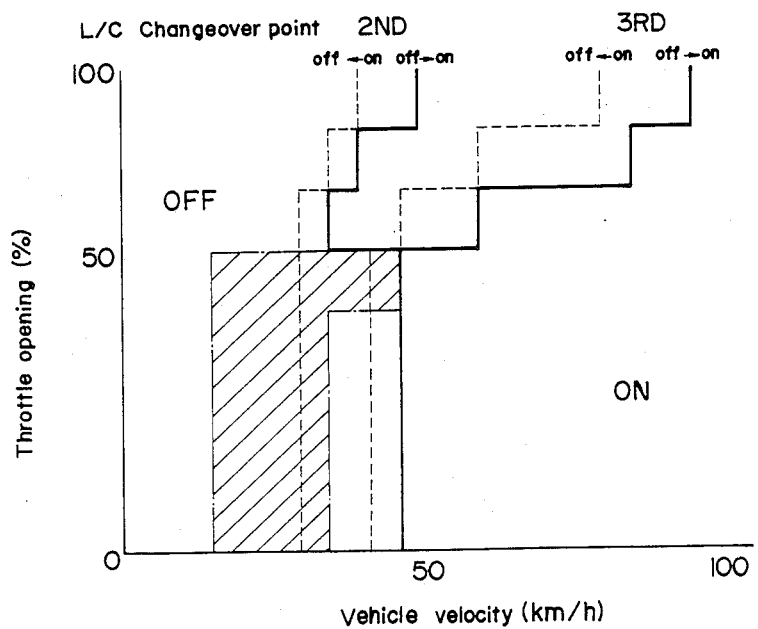
FIG. 6 is a lock-up clutch changeover diagram set in accordance with the illustrated embodiment.
Figure 8:
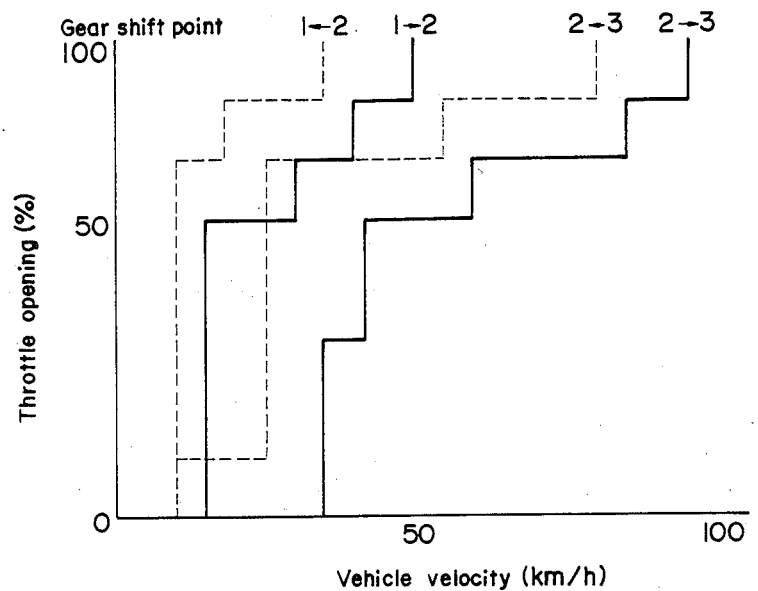
FIG. 8 is a vehicle velocity diagram set in accordance with the conventional control method.
Figure 9:
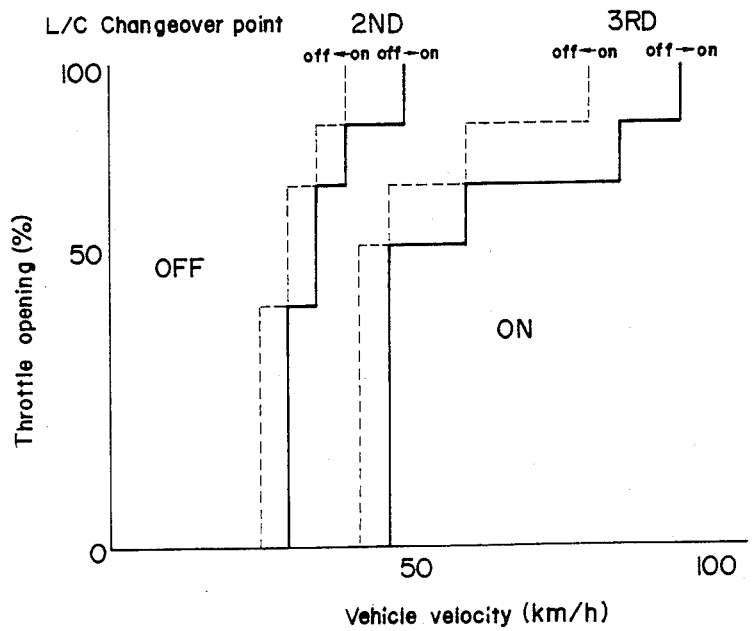
FIG. 9 is a lock-up clutch changeover diagram set in accordance with the conventional control method.

Next, a step (m) in FIG. 3 calls for reading a lock-up clutch actuation target in the changeover diagram of FIG. 6 based on the shift position, throttle opening and vehicle velocity. It is then determined at a step (n) whether the lock-up clutch is to be engaged. If the answer received is YES, then the setting of the clutch is made the engaged state at a step (o). If a NO answer is received at the step (n), then the setting of the clutch is made the disengaged state at a step (p).

Figure 7:
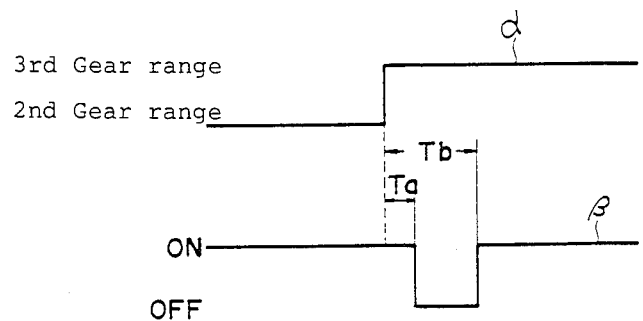
FIG. 7 is a timing chart illustrating the operating timing of a lock-up clutch in accordance with the illustrated embodiment.
Figure 4:
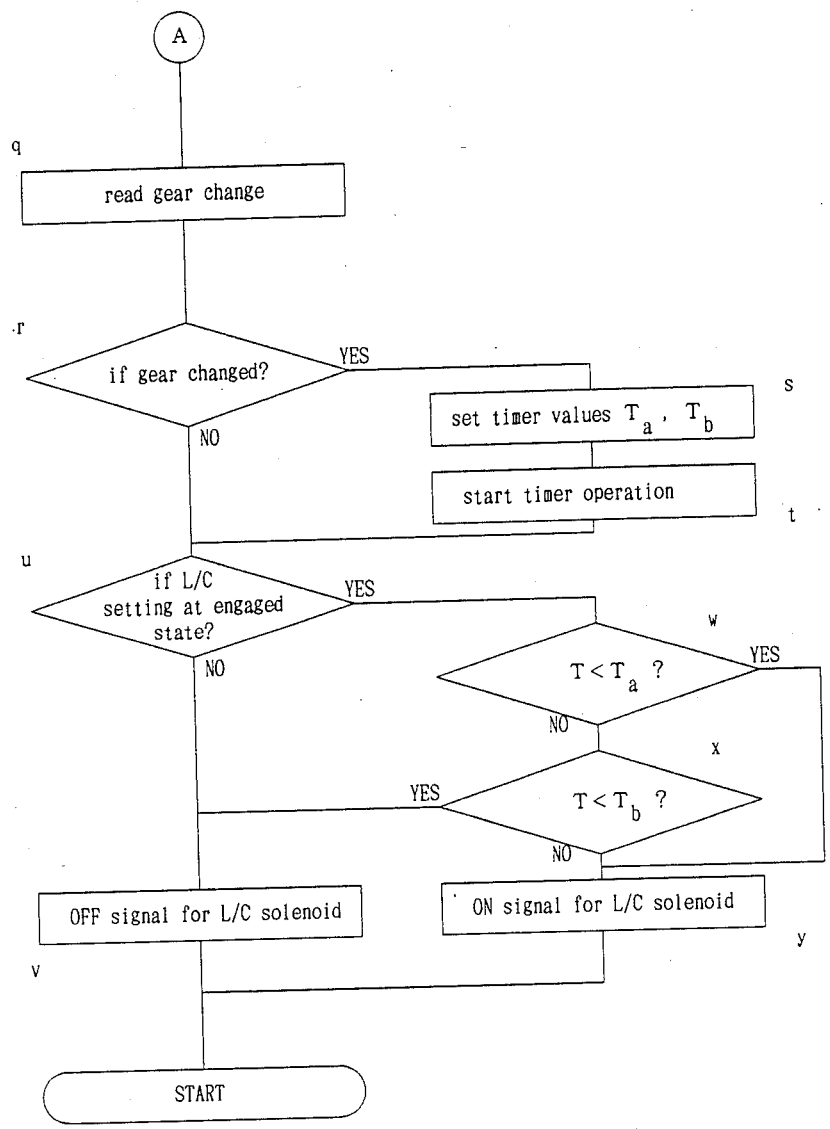
Figure 5:
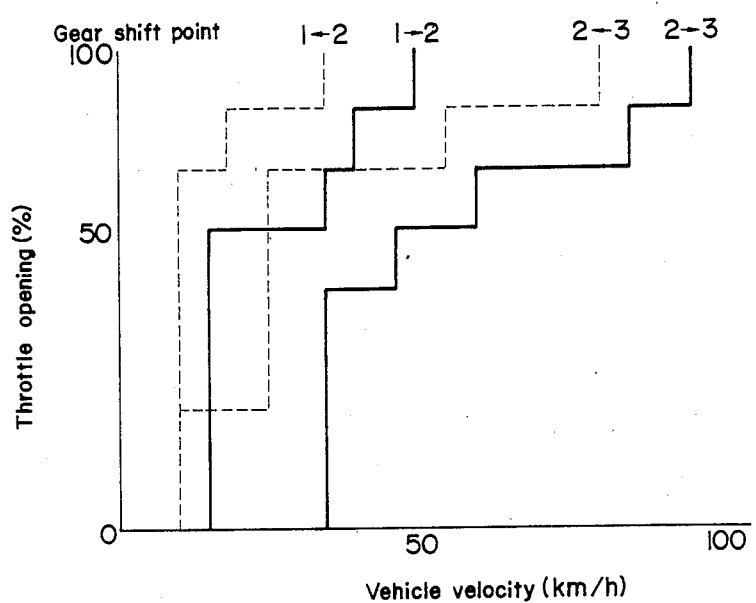
FIG. 5 is a vehicle velocity diagram set in accordance with the illustrated embodiment.

Next, a step (q) in the flow chart of FIG. 4 calls for reading in whether a gear change has taken place, namely whether a shift has been made from 2nd to 3rd. If a gear change is determined to have taken place at a step (r), then timer values are set to Ta and Tb at a step (s). These timer values Ta, Tb are for setting the timing of an output of the lock-up clutch solenoid actuation signal in a case where shift solenoid actuation signals have been outputted. When a shift solenoid actuation signal α for the shift from 2nd to 3rd is outputted, as shown in FIG. 7, a lock-up clutch solenoid actuation signal β changes state from on to off upon elapse of the time period Ta from issuance of the signal α, and then reverts from off to the on state upon elapse of the time period Tb from issuance of the signal α.

After the timer values are set at the step (s), the timer is started at a step (t). This is followed by a step (u), at which it is determined whether the setting of the lock-up clutch is indicative of the engaged state. Note that if the decision rendered at the step (r) is that no gear change has taken place, then the program proceeds directly to the step (u).

If it is decided at the step (u) that the clutch setting (signal) is not indicative of the engage state, then the lock-up clutch solenoid actuation signal is turned off at a step (v). If the clutch setting is found to be indicative of the engaged state at the step (u), on the other hand, then the timer value Ta is compared at a step (w) with time T that has elapsed from the moment the shift solenoid valve actuation signal for effecting a gear change is turned on. If the condition T<Ta holds at the step (w), then the lock-up clutch solenoid actuation signal is turned on at a step (y). If T≧Ta is found to hold at the step (w), the program proceeds to a step (x), at which the elapsed time T and the timer value Tb are compared. If T<Tb is determined to hold, then the lock-up clutch solenoid actuation signal is turned off at a step (v). If T≧Tb holds, the actuation signal is turned on at a step (y). After the step (y) or (v) is executed, the program returns to START. Namely, the lock-up clutch is disengaged for a short period of time from Ta to Tb when the gear shift is done and sensed and the lock-up clutch is in the engaged state, which serves to eliminate the shift shock.

Further as shown in FIG. 6 it is preferred that the changeover diagram further includes at least one changeover line turning the lock-up clutch from ON to OFF. The ON to OFF changeover line(s) is set apart from the OFF to ON changeover line extending in a region at a vehicle speed lower than the OFF to ON changeover line so that hysteresis can be established. The ON to OFF changeover line may extend so as to intersect the region (e.g., hatched area in FIG. 6) in the gear shift diagram where the shift position is at least 2nd range or less and the throttle opening is less than the predetermined value.

Thus, in the method of controlling the lock-up clutch whose shift schedule is as set forth above, control is performed in such a manner that the changeover line in the lock-up clutch changeover diagram set by the microcomputer will not intersect the 2nd gear range in which the throttle opening is less than 50% in the gear shift diagram. Accordingly, the lock-up clutch is not engaged in the 2nd gear region.

In the illustrated embodiment, the engagement of the lock-up clutch is inhibited in the 2nd gear range at the region where the throttle opening is less than 50%. However, the throttle valve opening region in which clutch engagement is inhibited can be selected at will. Furthermore, in a four forward-speed automatic transmission having an overdrive range, it can be arranged so that engagement of the lock-up clutch is inhibited in the 3rd gear range as well as in the 2nd gear range.

As many apparently widely different embodiments of the present invention can be made without departing from the spirit and scope thereof, it is to be understood that the invention is not limited to the specific embodiments thereof without departing from the scope as defined in the appended claims.

What we claim is:

1. A method of controlling a lock-up clutch in an automatic transmission of an automotive vehicle wherein the transmission comprises the lock-up clutch, a fluidic torque converter and a gear change mechanism, and an electronic control unit therefor, the method comprising the steps of:
   controlling, by the electronic control unit, changeover of the lock-up clutch by setting at least one changeover line turning the lock-up clutch from OFF to ON in a changeover diagram in which vehicle velocity and throttle opening are plotted along respective coordinate axes; and
   controlling, by the electronic control unit, changeover of transmission gear ranges by setting a transmission gear range changeover point in a gear shift diagram having coordinates axes identical with those of the changeover diagram; and
   the method further comprising:
   setting the OFF to ON changeover line in such a manner that it will not intersect a region in the gear shift diagram where the shift position is at least 3rd gear range or less and the throttle opening is less than a predetermined value.

2. The method as defined in claim 1, wherein said OFF to ON changeover line is set in such a manner that it will not intersect a region in the gear shift diagram where the shift position is at least 2nd gear range or less and the throttle opening is less than a predetermined value.

3. The method as defined in claim 1, wherein said changeover diagram further includes at least one changeover line indicating a region in which the lock-up clutch is changed over from ON to OFF, said ON to OFF changeover line being distinct from the OFF to ON changeover line extending in a region at a vehicle speed which is lower than the OFF to ON changeover line.

4. The method as defined in claim 1, wherein said lock-up clutch is disengaged for a short period of time when gear shift is sensed and the lock-up clutch is at an engaged state.

5. The method as defined in claim 1, wherein said lock-up clutch engagement is controlled by a microcomputer having a program operated in accordance with signals indicative of shift position, throttle opening, vehicle speed, shift gear range, setting position of gear range based on said gear shift diagram and setting position of the lock-up clutch based on said lock-up changeover diagram.

6. The method as defined in claim 5, wherein said program includes steps of:
   determining change in shift position,
   determining setting state of the lock-up clutch, and
   outputting a signal to disengage the lock-up clutch when the shift position is changed and the lock-up clutch is at an engaged state.

* * * * *